(12) United States Patent
Ahmed et al.

(10) Patent No.: US 12,426,120 B2
(45) Date of Patent: Sep. 23, 2025

(54) METHOD AND SYSTEM FOR OPTIMIZING IMS PDN CONNECTION IN COMMUNICATION SYSTEM

(71) Applicant: SAMSUNG ELECTRONICS CO., LTD., Suwon-si (KR)

(72) Inventors: Mustque Ahmed, Bangalore (IN); Murali Reddiboyana, Bangalore (IN); Gururaj B Malannavar, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/661,338

(22) Filed: May 10, 2024

(65) Prior Publication Data

US 2025/0063070 A1    Feb. 20, 2025

Related U.S. Application Data

(63) Continuation of application No. PCT/KR2024/004674, filed on Apr. 8, 2024.

(30) Foreign Application Priority Data

Aug. 16, 2023    (IN) .............................. 202341054958

(51) Int. Cl.
*H04W 76/19* (2018.01)
*H04L 65/1016* (2022.01)
(Continued)

(52) U.S. Cl.
CPC ......... *H04W 76/19* (2018.02); *H04L 65/1016* (2013.01); *H04L 65/1069* (2013.01);
(Continued)

(58) Field of Classification Search
CPC ............ H04W 76/19; H04W 76/30–38; H04L 65/1066–1073
See application file for complete search history.

(56) References Cited

U.S. PATENT DOCUMENTS 10,602,483 B2 * 3/2020 Singh .................. H04W 60/005
11,166,334 B2    11/2021 Wang et al.
(Continued)

FOREIGN PATENT DOCUMENTS

CN    113596942 A    11/2021
EP    3 471 465 A1    10/2020
WO    2021/224183 A1    11/2021

OTHER PUBLICATIONS

3GPP TS 24.229, V18.5.0, 3rd Generation Partnership Project; Technical Specification Group Core Network and Terminals; IP multimedia call control protocol based on Session Initiation Protocol (SIP) and Session Description Protocol (SDP); Stage 3, (Release 18), 5G Advanced, Technical Specification, Mar. 2024, 1099 pages.
(Continued)

*Primary Examiner* — Brendan Y Higa
(74) *Attorney, Agent, or Firm* — Sughrue Mion, PLLC

(57) ABSTRACT

A method for optimizing an internet protocol (IP) multimedia subsystem (IMS) packet data network (PDN) connection, includes: establishing, by a user equipment (UE), an IMS PDN connection and an internet PDN connection with at least one data network element of a communication network, wherein a primary IP address corresponding to the IMS PDN connection and a secondary IP address corresponding to the internet PDN connection are allocated to the UE by the at least one data network element; sharing, by the UE with an IMS, the secondary IP address over the internet PDN connection, before disconnecting the IMS PDN connection by the communication network; receiving, by the UE from the IMS, a mobile terminated (MT) call notification
(Continued)

using the secondary IP address over the internet PDN connection; and based on the received MT call notification, re-establishing, by the UE, the IMS PDN connection.

20 Claims, 6 Drawing Sheets

(51) Int. Cl.
*H04L 65/1069* (2022.01)
*H04L 65/1073* (2022.01)
*H04L 65/1104* (2022.01)
*H04W 76/38* (2018.01)

(52) U.S. Cl.
CPC ...... *H04L 65/1073* (2013.01); *H04L 65/1104* (2022.05); *H04W 76/38* (2018.02)

(56) References Cited

U.S. PATENT DOCUMENTS

| | | |
|---|---|---|
| 11,503,654 B2 | 11/2022 | Nacer et al. |
| 11,722,534 B2 | 8/2023 | Karampatsis et al. |
| 2010/0054220 A1 | 3/2010 | Bischinger et al. |
| 2011/0134913 A1 | 6/2011 | Astrom et al. |
| 2012/0307621 A1* | 12/2012 | Zawaideh ............. H04W 76/19 |
| | | 370/216 |
| 2013/0148550 A1* | 6/2013 | Milinski ............. H04L 65/1016 |
| | | 370/259 |
| 2013/0258998 A1* | 10/2013 | Ramachandran ..... H04W 76/32 |
| | | 370/331 |
| 2014/0189790 A1 | 7/2014 | Mindler et al. |
| 2014/0269349 A1* | 9/2014 | Ramachandran ..... H04W 76/34 |
| | | 370/248 |
| 2015/0230091 A1* | 8/2015 | Sahu ..................... H04L 43/18 |
| | | 455/410 |
| 2016/0174191 A1* | 6/2016 | Singh .................... H04W 68/12 |
| | | 370/329 |
| 2016/0212795 A1* | 7/2016 | Chang .................. H04W 76/32 |
| 2016/0380802 A1* | 12/2016 | Kunz ...................... H04L 41/06 |
| | | 370/216 |
| 2018/0054767 A1 | 2/2018 | Gholmieh et al. |
| 2018/0337961 A1 | 11/2018 | Lin |
| 2020/0305211 A1 | 9/2020 | Foti et al. |
| 2020/0344711 A1* | 10/2020 | Stille .................... H04W 76/38 |
| 2020/0383166 A1* | 12/2020 | Venkataraman ...... H04W 76/30 |
| 2021/0136634 A1 | 5/2021 | Bakker et al. |
| 2022/0166878 A1* | 5/2022 | Xia ..................... H04L 65/1069 |
| 2025/0150493 A1* | 5/2025 | Reddiboyana ...... H04L 65/1069 |

OTHER PUBLICATIONS

IMS Profile for Voice, Video and Messaging over 5GS, Version 1.0, GSM Association, Official Document NG.114—IMS Profile for Voice, Video and Messaging over 5GS, Aug. 7, 2020, 74 pages.
International Search Report dated Aug. 7, 2024, issued by the International Searching Authority in International Application No. PCT/KR2024/004674.
Written Opinion dated Aug. 7, 2024, issued by the International Searching Authority in International Application No. PCT/KR2024/004674.
"Change Request", 3GPP TSG-RAN5 Meeting #99, R5-232900, 2023 (18 pages total).
"Change Request", 3GPP TSG-RAN5 Meeting #98, R5-231938, 2023 (30 pages total).

* cited by examiner

METHOD AND SYSTEM FOR OPTIMIZING IMS PDN CONNECTION IN COMMUNICATION SYSTEM

CROSS-REFERENCE TO RELATED APPLICATIONS

This application is a by-pass continuation application of International Application No. PCT/KR2024/004674, filed on Apr. 8, 2024, which is based on and claims priority to Indian Patent Application number 202341054958, filed on Aug. 16, 2023, in the Indian Intellectual Property Office, the disclosures of which are incorporated by reference herein their entireties.

BACKGROUND

1. Field

The disclosure is related to telecommunication network, more particularly, to a method and system for optimizing Internet Protocol (IP) Multimedia Subsystem (IMS) Packet Data Network (PDN) connection in communication systems.

2. Description of Related Art

Currently, in fourth (4G) and fifth (5G) generation communication system, a user equipment (UE) may be allocated two packet data network (PDN) connections, i.e., an internet protocol (IP) multimedia subsystem (IMS) packet data network (PDN) connection and a PDN internet connection as part of dimensioning policy of a communication network. However, currently, a majority of the end-to-end 'enhanced mobile broadband' (eMBB) devices use various mobile applications to connect with one another for exchanges of multimedia services such as texts, voice calls and videos. These mobile applications utilize the internet PDN connection to send and receive data. Therefore, a majority of communications are established over the internet PDN connection. A smaller percentage of the communication in eMBB device access the IMS PDN connection for messaging, voice calls or video calls, which are short-lived sessions which leads to inefficient usage of the communication network's resources. Therefore, there is a need to efficiently make use of the PDN connections assigned to each UE and eMBB device.

The information disclosed in this background is only for enhancement of understanding of the general background of the disclosure and should not be taken as an acknowledgement or any form of suggestion that this information forms the prior art already known to a person skilled in the art.

SUMMARY

According to an aspect of the disclosure, a method for optimizing an internet protocol (IP) multimedia subsystem (IMS) packet data network (PDN) connection, includes: establishing, by a user equipment (UE), an IMS PDN connection and an internet PDN connection with at least one data network element of a communication network, wherein a primary IP address corresponding to the IMS PDN connection and a secondary IP address corresponding to the internet PDN connection are allocated to the UE by the at least one data network element; sharing, by the UE with an IMS, the secondary IP address over the internet PDN connection, before disconnecting the IMS PDN connection by the communication network; receiving, by the UE from the IMS, a mobile terminated (MT) call notification using the secondary IP address over the internet PDN connection; and based on the received MT call notification, re-establishing, by the UE, the IMS PDN connection.

According to an aspect of the disclosure, a method for optimizing an internet protocol (IP) multimedia subsystem (IMS) packet data network (PDN) connection, includes: receiving, by at least one data network element of a communication network from a user equipment, a request for establishing an IMS PDN connection and an internet PDN connection; allocating, by the at least one data network element to a user equipment (UE), a primary IP address corresponding to the IMS PDN connection and a secondary IP address corresponding to the internet PDN connection; receiving, by an IMS from the UE, the secondary IP address over the internet PDN connection, before disconnecting the IMS PDN connection by the communication network; sending, by the IMS to the UE, a mobile terminated (MT) call notification using the secondary IP address, over the internet PDN connection after detecting a MT call directed to the UE, wherein the IMS PDN connection is re-established by the UE, based on the MT call notification.

According to an aspect of the disclosure, a user equipment (UE) for optimizing an internet protocol (IP) multimedia subsystem (IMS) packet data network (PDN) connection, includes: at least one processor; and at least one memory, wherein the at least one processor is configured to: establish an IMS PDN connection and an internet PDN connection with at least one data network element of a communication network, wherein a primary IP address corresponding to the IMS PDN connection and a secondary IP address corresponding to the internet PDN connection are allocated to the UE by the at least one data network element (106); share with an IMS, the secondary IP address over the internet PDN connection, wherein the IMS PDN connection is disconnected by the communication network; receive from the IMS, a mobile terminated (MT) call notification using the secondary IP address over the internet PDN connection; and re-establish the IMS PDN connection based on the MT call notification.

According to an aspect of the disclosure, a communication network for optimizing an internet protocol (IP) multimedia subsystem (IMS) packet data network (PDN) connection, includes: at least one processor; at least one data network element; and an IMS, wherein the at least one processor is configured to: receive, by the at least one data network element from a user equipment (UE), a request for establishing an IMS PDN connection and an internet PDN connection; allocate, by the at least one data network element to the UE, a primary IP address corresponding to the IMS PDN connection and a secondary IP address corresponding to the internet PDN connection; receive, by an IMS from the UE, the secondary IP address over the internet PDN connection, wherein the IMS PDN connection is disconnected by the at least one data network element; send, by the IMS to the UE, a mobile terminated (MT) call notification using the secondary IP address, over the internet PDN connection after detecting a MT call directed to the UE; and re-establish, by the IMS, the IMS PDN connection based on the MT call notification.

According to an aspect of the disclosure, a system for optimizing an internet protocol (IP) multimedia subsystem (IMS) packet data network (PDN) connection, includes: a UE; and a communication network comprising at least one data network element and an IMS.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference features and components. Some embodiments of system and/or methods in accordance with embodiments of the disclosure are now described, by way of example only, and regarding the accompanying figures, in which.

Figure 1:
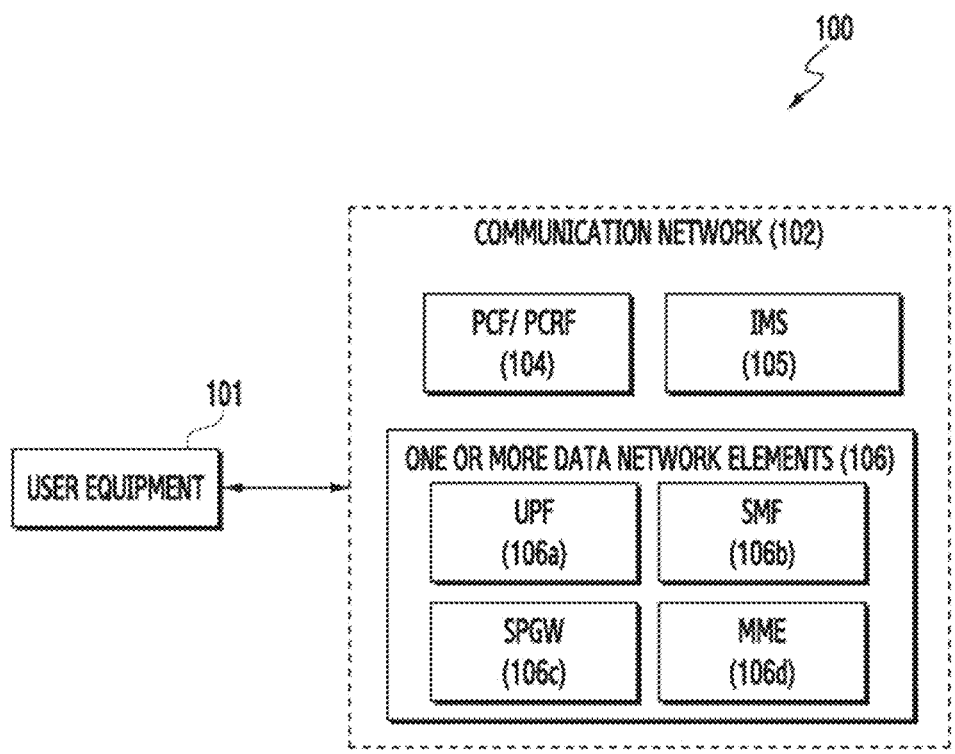
FIG. 1 illustrates a system for optimizing an IP multimedia subsystem (IMS) packet data network (PDN), in accordance with some embodiments pf the disclosure.

It should be appreciated by those skilled in the art that any block diagrams herein represent conceptual views of illustrative systems embodying the principles of the disclosure. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not be limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since various embodiments of the disclosure may include a technology that utilizes both the hardware-based and the software-based approaches, they are not intended to exclude the software-based approach.

As used herein, the terms referring to merging (e.g., merging, grouping, combination, aggregation, joint, integration, unifying), the terms referring to signals (e.g., packet, message, signal, information, signaling), the terms referring to resources (e.g. section, symbol, slot, subframe, radio frame, subcarrier, resource element (RE), resource block (RB), bandwidth part (BWP), opportunity), the terms used to refer to any operation state (e.g., step, operation, procedure), the terms referring to data (e.g. packet, message, user stream, information, bit, symbol, codeword), the terms referring to a channel, the terms referring to a network entity (e.g., distributed unit (DU), radio unit (RU), central unit (CU), control plane (CU-CP), user plane (CU-UP), O-DU-open radio access network (O-RAN) DU), O-RU (O-RAN RU), O-CU (O-RAN CU), O-CU-UP (O-RAN CU-CP), O-CU-CP (O-RAN CU-CP)), the terms referring to the components of an apparatus or device, or the like are only illustrated for convenience of description in the disclosure. Therefore, the disclosure is not limited to those terms described below, and other terms having the same or equivalent technical meaning may be used therefor. Further, as used herein, the terms, such as '~ module', '~ unit', '~ part', '~ body', or the like may refer to at least one shape of structure or a unit for processing a certain function.

Further, throughout the disclosure, an expression, such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression, such as 'above', a condition described as 'less than or equal to' may be replaced with an expression, such as 'below', and a condition described as 'more than or equal to and below' may be replaced with 'above and less than or equal to', respectively. Furthermore, hereinafter, 'A' to 'B' means at least one of the elements from A (including A) to B (including B). Hereinafter, 'C' and/or 'D' means including at least one of 'C' or 'D', that is, {'C', 'D', or 'C' and 'D'}.

The disclosure describes various embodiments using terms used in some communication standards (e.g., 3rd Generation Partnership Project (3GPP), extensible radio access network (xRAN), open-radio access network (O-RAN) or the like), but it is only of an example for explanation, and the various embodiments of the disclosure may be easily modified even in other communication systems and applied thereto.

In the disclosure, the word "exemplary" is used herein to mean "serving as an example, instance, or illustration." Any embodiment or implementation of the disclosure described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or operations does not include only those components or operations but may include other components or operations not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "includes", "including", or any other variations thereof, are intended to cover a non-exclusive inclusion, such that a setup, device, or method that includes a list of components or operations does not include only those components or operations but may include other components or operations not expressly listed or inherent to such setup or device or method. In other words, one or more elements in a system or apparatus proceeded by "includes . . . a" does not, without more constraints, preclude the existence of other elements or additional elements in the system or method. The terms "including", "comprising", "having" and variations thereof mean "including but not limited to", unless expressly specified otherwise.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the term "user equipment" may refer to any electronic device that may be transported and operated by a user, which may also provide remote communication capabilities to a network and supports cellular communication. Examples of remote communication capabilities include using a mobile phone (wireless) network, wireless data network (e.g., 5G or similar networks), or any other communication medium that may provide access to a communication network. Examples of user equipment includes mobile phones (e.g., cellular phones), PDAs, tablet computers, net books, laptop computers, personal computers etc. A mobile device may comprise any suitable hardware and software for performing such functions and may also include multiple devices or components (e.g., when a device has remote access to a network by tethering to another device—i.e., using the other device as a relay-both devices taken together may be considered a single mobile device).

As used herein, the term "processor" may refer to any suitable data computation device or devices. The (at least one) processor may comprise one or more microprocessors working together to accomplish a desired function. The (at least one) processor includes or corresponds to circuitry like a central processing unit (CPU), a microprocessor unit (MPU), an application processor (AP), a coprocessor (CP), a system-on-chip (SoC), or an integrated circuit (IC). The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

As used herein, the term "memory" may be any suitable device or devices that can store electronic data. The memory may be or correspond to one or more memories. The memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

As used herein, the term "UPF" or "user plane function", may be a communication network element that supports features and capabilities to facilitate user plane operations such as, without limitation to, packet routing and forwarding, interconnection to the data network, policy enforcement and data buffering.

As used herein, the term "SMF" or "session management function", may be a communication network element that may be responsible for, without limitation to, interacting with the decoupled data plane, creating, updating and removing Protocol Data Unit (PDU) sessions and managing session context with the User Plane Function (UPF).

As used herein, the term "SPGW" or "serving PDN gateway", may be a combination of LTE Serving Gateway and LTE PDN Gateway that may support GTP-based non-roaming and roaming architectures, and control and data plane functions defined by 3GPP TS 23.401 for 3GPP access networks. The SPGW may service SGW-only, PGW-only, GGSN, or SPGW sessions.

As used herein, the term "MME" or "mobility management entity", may be a communication network element that may provide mobility and session management for communication networks and may support subscriber authentication, roaming and handovers to other networks.

As used herein, the term "IMS" or "internet protocol (IP) multimedia subsystem (IMS)", may refer to a communication network element that may unify access of broadband/narrowband and fixed/wireless networks. IMS also provides convergent and IP-based multimedia services. IMS facilitates transformation from fixed mobile convergence (FMC) and traditional voice services to Information and Communication Technology (ICT) convergent services.

As used herein, the term "PCF" or "policy control function", may refer to a communication network element that may use policy subscription information stored in a user data repository (UDR) to provide policy rules to network functions (SMF or AMF).

As used herein, the term "PCRF" or "policy and charging rules function", may refer to a communication network element that may integrate an avalanche of information to and from various multimedia networks like portals, operational support system, and charge rules and create policy decisions for each active network subscriber.

As used herein, the term "MT call" or "mobile terminated call", may refer to a mobile message or voice call routed through an IMS from another mobile user and delivered to the end user's mobile device.

As used herein, the term "session initiation protocol (SIP) invite", may refer to a message sent by a calling party inviting a recipient for a communication session.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

FIG. 1 illustrates a system 100 for optimizing an IMS PDN connection. The system may include a user equipment 101 and a communication network 102. The communication network 102 may further include an IMS 105, a PCF/PCRF 104 and one or more data network elements (at least one data network element) 106. The one or more data network elements 106 may comprise, without limitation to, a UPF 106a, an SMF 106b, an SPGW 106c and an MME 106d. The various components of the communication network 102, such as, without limitation to, the IMS 105, the PCF/PCRF 104, the one or more data network elements 106, such as, without limitation to, the UPF 106a, the SMF 106b, the SPGW 106c and the MME 106d, may be implemented as software or hardware components.

In an embodiment, one or more components of the communication network 102 may be configured to receive from the UE 101 a request for establishing an IMS PDN connection and an internet PDN connection.

The one or more data network elements 106 may allocate a primary Internet Protocol (IP) address corresponding to the IMS PDN connection and a secondary IP address corresponding to the internet PDN connection to the UE 101.

The IMS 105 may receive the secondary IP address from the UE 101, over the internet PDN connection. The IMS 105 may receive an SIP pseudo registration message from the UE 101. The SIP pseudo registration message may be indicated as a "PSEUDO REGISTRATION" message. The secondary IP address is bound by the IMS 105 with a URI of the UE 101.

The IMS PDN connection may be disconnected by the one or more data network elements 106 due to inactivity in the IMS PDN connection, as described below.

In an embodiment, in a 5G system, the UPF 106a may monitor a timer value for the IMS PDN connection inactivity, and may send the timer value to the SMF 106b. The SMF 106b may delete the IMS PDN connection when the timer value exceeds a defined threshold (such as, without limitation to, three minutes) and may send an IMS PDN connection session release cause message to a PCF 104, including a value indicating an optimization of the IMS PDN connection.

In another embodiment, in a 4G system, the SPGW 106c may monitor a timer value for the IMS PDN connection inactivity and may initiate deletion of the IMS PDN connection, when the timer value exceeds a defined threshold value. The SPGW 106c may then send a request to the MME 106d to delete the IMS PDN connection. Thereafter, the MME 106d may delete the IMS PDN connection and clean up access resources of the communication network 102 and notify the SPGW 106c of the same. The SPGW 106c may send to the PCRF 104, an IMS PDN connection session release cause message including a value indicating an optimization of the IMS PDN connection, upon deletion of the IMS PDN connection.

In an embodiment, the IMS 105 may send a mobile terminated (MT) call notification using the secondary IP address, over the internet PDN connection after detecting a MT call directed to the UE 101. The IMS 105 may send SIP invite over the internet PDN connection to the UE 101 and the UE 101 may re-establish the IMS PDN connection based on the MT call notification.

In an embodiment, the IMS 105 may receive an SIP registration request and the IMS 105 may send an SIP registration confirmation message over the IMS PDN connection to the UE 101 on successful SIP registration and the IMS 105 may connect to the UE 101 for a MT call.

Figure 2:
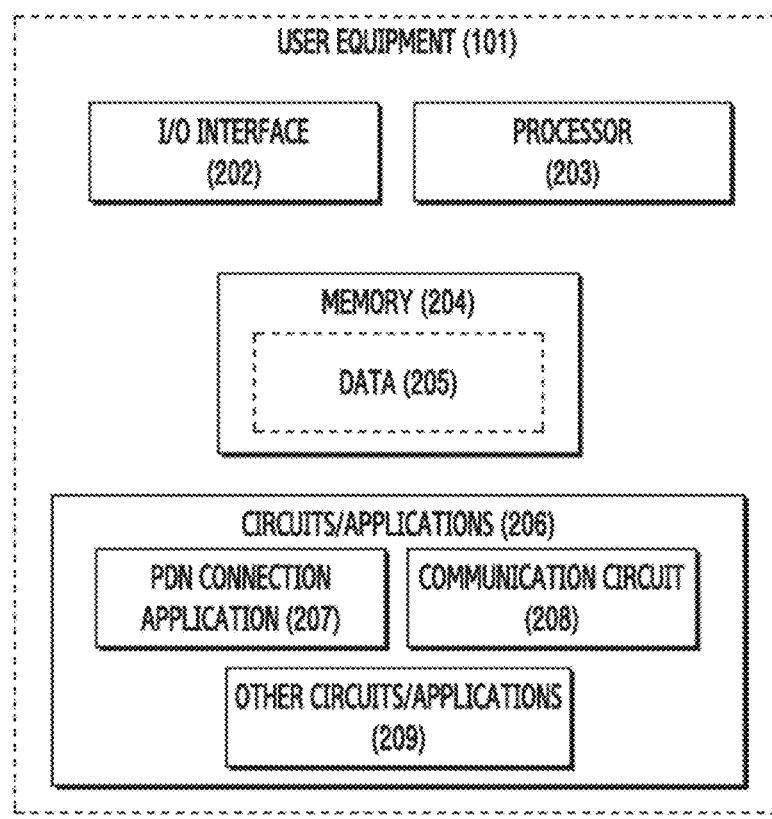
FIG. 2 illustrates a detailed a block diagram of a user equipment (UE), in accordance with some embodiments of the disclosure.

FIG. 2 illustrates a detailed a block diagram of a UE 101 that may include a processor 203, an input/output (I/O) interface 202, a memory 204 and circuits/applications (or modules) 206. The memory 204 may include data 205. The circuits/applications (or modules) 206 may further include, without limitation to, a communication circuit 208, a PDN connection application 207, and other circuits/applications 209.

In an embodiment, the data 205 may include various temporary data and files generated by the circuits/applications (or modules) 206.

As used herein, the term circuits/applications (or modules) 206 may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the circuits/applications (or modules) 206 may be configured as stand-alone hardware computing units. In an embodiment, the other circuits/applications 209 may be used to perform various miscellaneous functionalities of the UE 101. Such circuits/applications (or modules) 206 may be represented as a single circuit, a single application, or a combination of multiple circuits and applications.

In an embodiment, the communication circuit 208 may be configured to receive and transmit, without limitation to, one or more messages or notifications or data from the communication network 102, such as, without limitation to, data associated with the SIP invite, data associated with the SIP registration request, the SIP confirmation message, the SIP pseudo registration message. The SIP pseudo registration message may be indicated as a "PSEUDO REGISTRATION" message. The PDN connection application 207 may be used to establish one or more PDN connections with the communication network 102.

In an embodiment, the PDN connection application 207 may be used to establish an IMS PDN connection and an internet PDN connection with one or more data network elements 106 of the communication network 102. A primary IP address corresponding to the IMS PDN connection and a secondary IP address corresponding to the internet PDN connection may be allocated to the UE 101 by the one or more data network elements 106. In an embodiment, the communication circuit 208 may share the secondary IP address to the IMS 105 over the internet PDN connection for UE's 101 reachability in case of an MT call. The communication circuit 208 may send an SIP pseudo registration message to the IMS 105 for registering with the IMS 105 over the secondary IP address. The SIP pseudo registration message may be indicated as a "PSEUDO REGISTRATION" message in standards. The IMS PDN connection may be disconnected by the communication network 102 due to inactivity in the IMS PDN connection to release resources. For example, without limitation, when there is inactivity in the IMS PDN connection for three minutes, the one or more data network elements 106 may disconnect the IMS PDN connection.

In an embodiment, the communication circuit 208 may receive a MT call notification from the IMS 105 using the secondary IP address over the internet PDN connection. The communication circuit 208 may receive the SIP invite over the internet PDN connection. The PDN connection application 207 may be used to re-establish the IMS PDN connection based on the MT call notification.

In an embodiment, the communication circuit 208 may send an SIP registration request over the IMS PDN connection.

In an embodiment, the communication circuit 208 may receive from the IMS 105 an SIP registration confirmation message over the IMS PDN connection and may be configured to connect to the IMS 105 for a MT call.

Figure 3:
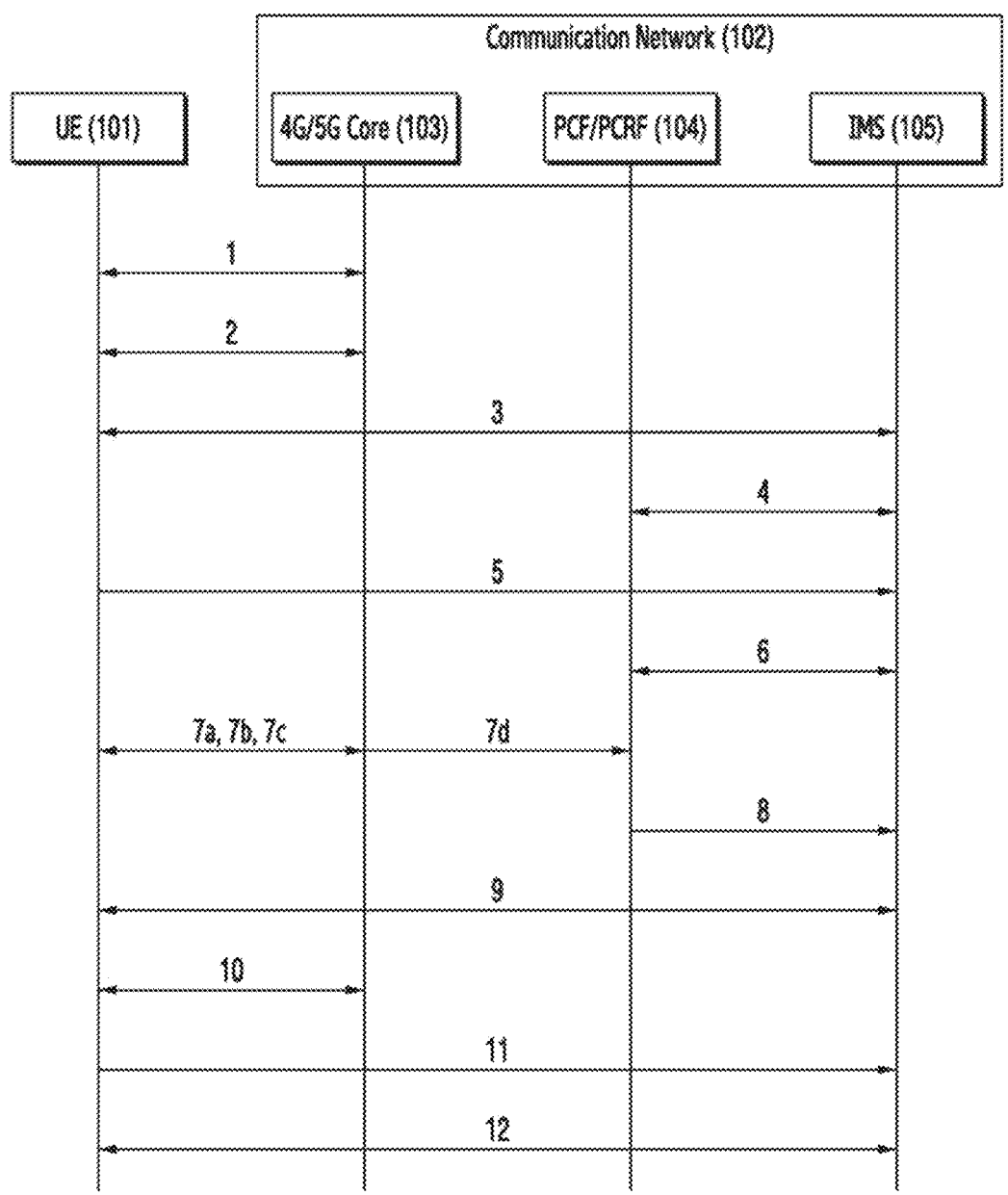
FIG. 3 illustrates an exemplary message flow between UE and communication network for optimizing an IMS PDN connection, in accordance with some embodiments of the disclosure.

FIG. 3 is an exemplary message flow between a UE 101 and a communication network 102 for optimizing an IP IMS PDN connection. The communication network 102 may further include, without limitation to, a Fourth Generation (4G)/Fifth Generation (5G) core 103, a Policy Control Function (PCF)/Policy and a Charging Rules Function (PCRF) 104 and an IMS 105.

At operation 1, the UE 101 may establish an internet PDN connection with one or more data network elements 106 of the communication network 102 and a secondary IP address corresponding to the internet PDN connection may be allocated to the UE 101 by the one or more data network elements 106. The internet PDN connection may be established for providing data services to the UE 101.

At operation 2, the UE 101 may establish an IMS PDN connection with the one or more data network elements 106 of the communication network 102 and a primary Internet Protocol (IP) address corresponding to the IMS PDN connection may be allocated to the UE 101 by the one or more data network elements 106.

At operation 3, the UE 101 may perform Session Initiation Protocol (SIP) registration over the IMS PDN connection with the IMS 105 with the primary IP address for receiving voice and Short Message Service (SMS) services.

At operation 4, the IMS 105 may bind the IMS PDN connection with the PCF (in a 5G communication system)/PCRF (in a 4G communication system) 104 using the primary IP address with a PCF/PCRF 104 with a Uniform Resource Identifier (URI) of the UE 101.

At operation 5, the UE 101 may perform SIP pseudo registration of the UE 101 over the internet PDN connection with the IMS 105 with the secondary IP address.

Exemplary SIP pseudo registration message. The SIP pseudo registration message may be indicated as a "PSEUDO REGISTRATION" message:

Request-Line: PSEUDO_REGISTER sip:p-cscf_address SIP/2.0
Method: PSUEDO_REGISTER
Via: SIP/2.0/UDP UE-IP;branch=string
Route: sip: [P-CSCF-IP] (optional)
Max-Forwards: Integer Value
From: <same as sip-register>;tags=string
To : <same as sip-register>;tags=string
Call-ID: string (same as SIP-Register Call-ID)
Cseq: integer (Monotonically increase from the previous SIP-Register Dialog)
Contact : public_identity:s_port
Allow: SIP Method Supported
User-Agent : string
Supported : string
Content-Length : integer At operation 6, the IMS 105 may bind the internet PDN connection with the PCF (in a 5G communication system)/PCRF (in a 4G communication system) 104 using the secondary IP address with a PCF/PCRF 104 with the URI of the UE 101, to charge the UE 101 according to the usage of the communication services and for UE's 101 reachability by the IMS 105.

At operation 7, the communication network 102 initiates the deletion of the IMS PDN connection.

In an embodiment, the following operations may be performed in a 5G communication system.

At operation 7a, a Session Management Function (SMF) 106b of the communication system 105 may comprise a local IMS Data Network Name (DNN) specific user plane inactivity timer and may be shared with a User Plane Function (UPF) 106a of the communication system 105 during session establishment.

At operation 7b, the UPF 106a may monitor the timer for the IMS PDN connection inactivity and report the IMS PDN connection inactivity to the SMF 106b, when the timer value exceeds a predefined threshold time. For example, without limitation, when there is inactivity in the IMS PDN connection for three minutes, the UPF 106a may report the inactivity to the SMF 106b. The IMS PDN connection may be deleted only after the predefined threshold time of inactivity, so that a mobile-initiated IMS call may be accommodated if a need for the same arises.

At operation 7c, the SMF 106b may delete the IMS PDN connection based on the UPF's 106a inactivity report. At operation 7d, the SMF 106b may delete SM Policy Association in PCF 104 using "Npcf_SMPolicyControl_Delete Request" message, sent from the SMF 106b to the PCF 104, with a new "PduSessionRelCause" cause "OPTIMIZATION" request. A new cause may be used to differentiate from the normal causes used for termination. In an embodiment, a new feature support may be defined in PCF 104 for "Npcf_SMPolicyControl" Application Programming Interface (API) "IMSOptimization", to support IMS PDN connection optimization. In an embodiment, the PCF 104 may notify an Application Function (AF) node of the communication network 104, of the deletion of the application session a new context with termination cause: "OPTIMIZATION_SERVER_RESOURCE", to differentiate from normal termination of IMS PDN connection. In such a case, the AF may move UE Context to an inactive state.

In an embodiment, the following operations may be performed in a 4G communication system.

At operation 7a, a Serving PDN Gateway (SPGW) (PGW in case of non-combo GW) 106c may contain a local IMS Access Point Name IAPN) specific IMS PDN connection inactivity timer and may use this to initiate SPGW 106c initiated IMS PDN disconnection.

At operation 7b, when the timer exceeds a predefined threshold value, for example, three minutes, the SPGW 106c may initiate deletion of the IMS PDN connection and send a delete bearer request with a Linked Evolved Packet System (EPS) Bearer ID (LBI) to delete the resources associated with the IMS PDN Connection towards Mobility Management Entity (MME) 106d of a communication network 102.

At operation 7c, the MME 106d may delete access resources and respond to the SPGW 106c for further cleanup of core network resources. At operation 7d, the SPGW 106c may terminate an IP Connectivity Access Network (IP-CAN) session with PCRF 104 with a new Cause Attribute Value Pair (AVP) value: 33 "OPTIMIZATION'". A new cause may be used to differentiate from the normal causes used for termination. In an embodiment, a Policy and Charging Enforcement Function (PCEF) may send a Credit-Control-Request (CCR) to a PCRF 104, to terminate the Gx IP-CAN session for the IMS PDN connection deletion with the new termination cause: "OPTIMIZATION". In an embodiment, Abort-Session-Request (ASR): PCRF 104 may notify the IMS 105 of the deletion of the IMS PDN connection with a new abort cause value "OPTIMIZATION_SERVER_RESOURCE" due to optimization and to differentiate from normal termination of the IMS PDN connection and subsequently, the IMS 105 may move the UE context to inactive state.

At operation 8, a session release notification may be sent by PCF/PCRF 104 to IMS 105, with a cause "OPTIMIZATION_SERVER_RESOURCE" to move a UE context in IMS 105 to inactive state.

At operation 9, an IMS 105 may detect a mobile terminated call and may send an SIP-invite message to the UE 101, using the secondary IP address, over the internet PDN connection.

At operation 10, the UE 101 may re-establish the IMS PDN connection with the communication network 102 based on the MT call notification.

At operation 11, the UE 101 performs SIP Registration with the IMS 105 over IMS PDN connection.

At operation 12, the UE 101 may connect with the IMS 105 for a call.

Figure 4:
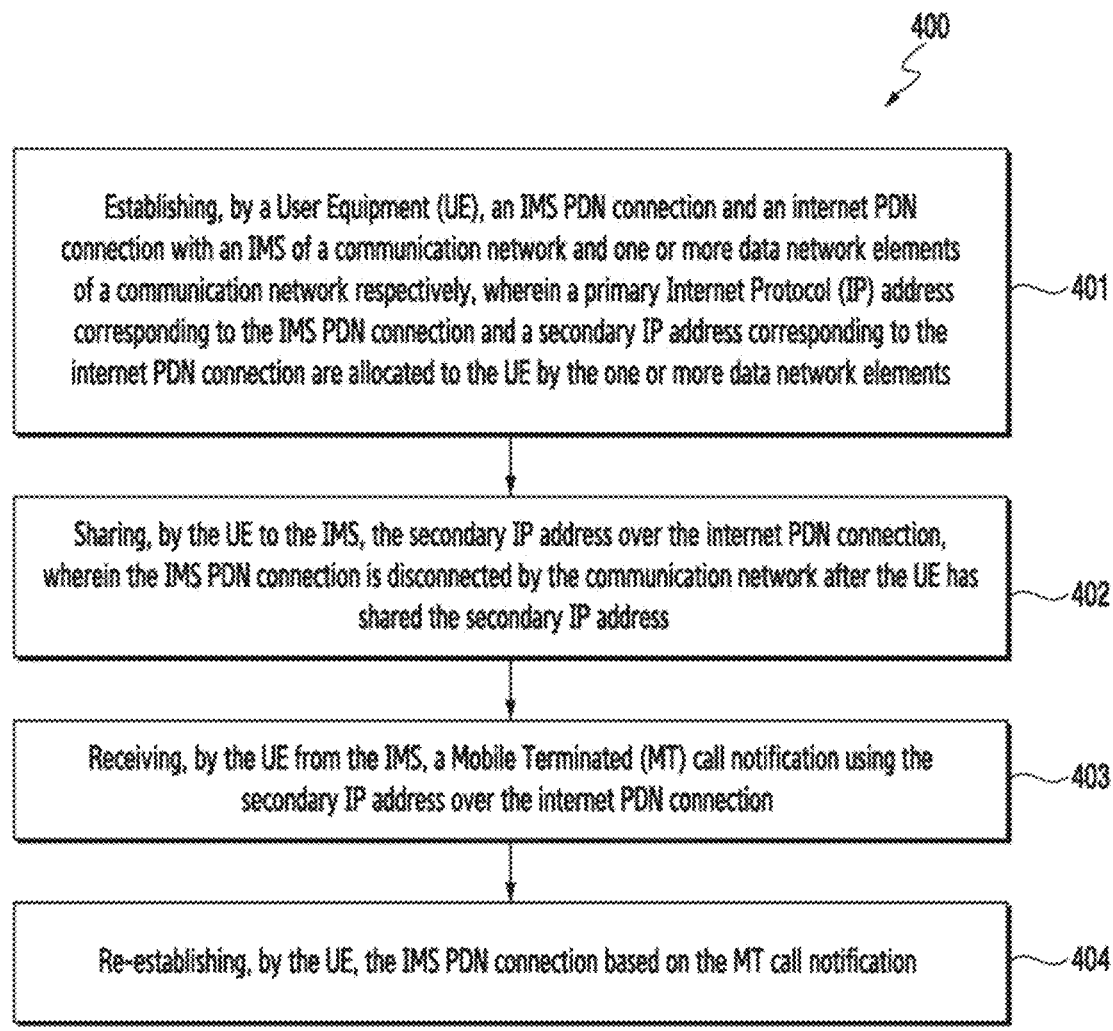
FIG. 4 illustrates a flow diagram of an exemplary method for optimizing an IMS PDN connection between a UE and a communication network, in accordance with some embodiments of the disclosure.

FIG. 4 illustrates a flow diagram of an exemplary method 400 for optimizing an IMS PDN connection between the UE 101 and the communication network 102.

At operation 401, the method 400 may include establishing by the UE 101 an IMS PDN connection and an internet PDN connection with the one or more data network elements 106 of a communication network 102. A primary IP address corresponding to the IMS PDN connection and a secondary IP address corresponding to the internet PDN connection are allocated to the UE 101 by the one or more data network elements 106.

At operation 402, the method 400 may include sharing by the UE 101 to the IMS 105, the secondary IP address over the internet PDN connection. The IMS PDN connection is disconnected by the communication network 102 after the UE 101 has shared the secondary IP address. In an embodiment, the UE 101 may share the secondary IP address with the IMS 105 for UE 101 reachability during the MT call, as the IMS PDN connection may be disconnected. In an embodiment, sharing the secondary IP address may include establishing an alternate communication session in place of the disconnected IMS PDN connection, for the communication network 102 to connect with the UE 101, in the event that the UE 101 may receive an MT call.

In an embodiment sharing the secondary IP address over the internet PDN connection, sending, by the UE 101 to the IMS 105 via an SIP pseudo registration message. The SIP pseudo registration message may be indicated as a "PSEUDO REGISTRATION" message.

At operation 403, the method 400 may include receiving by the UE 101 from the IMS 105, a MT call notification using the secondary IP address over the internet PDN connection.

In an embodiment, the UE 101 may receive from the IMS 105 an SIP invite over the internet PDN connection.

At operation 404, the method 400 may include re-establishing by the UE 101 the IMS PDN connection based on the MT call notification.

In an embodiment, the UE 101 may send an SIP registration request over the IMS PDN connection to the IMS 105. The UE 101 may receive from the IMS 105 an SIP registration confirmation message over the IMS PDN connection and may subsequently connect the IMS 105 for a MT call.

Figure 5:
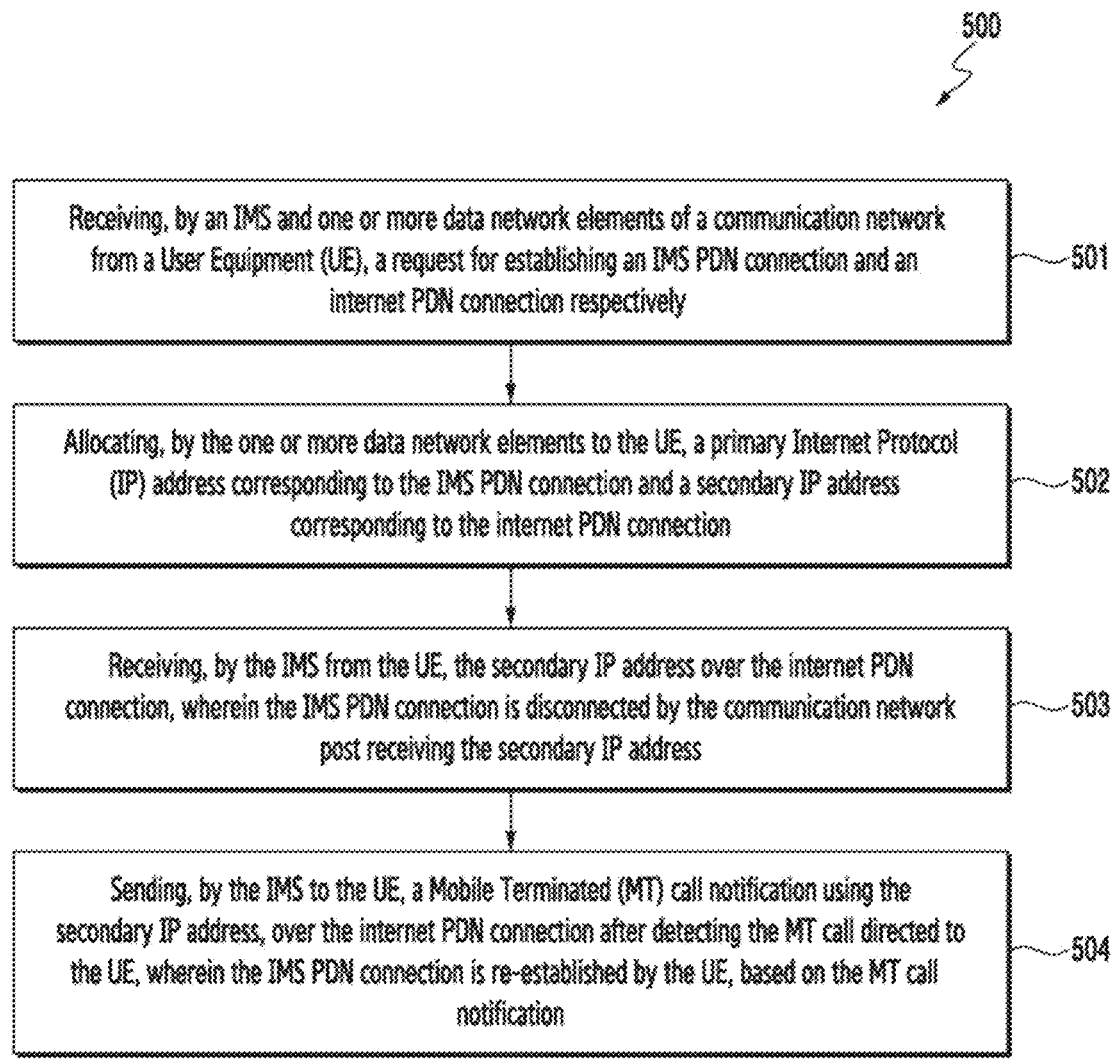
FIG. 5 illustrates a flow diagram of an exemplary method for optimizing an IMS PDN connection between a communication network and a UE, in accordance with some embodiments of the disclosure.

FIG. 5 illustrates a flow diagram of an exemplary method 500 for optimizing an IMS PDN connection between the communication network 102 and the UE 101.

At operation 501, the method 500 may include receiving by the one or more data network elements 106 of the communication network 102 from the UE 101, a request for establishing an IMS PDN connection and an internet PDN connection.

At operation 502, the method 500 may include allocating, by the one or more data network elements 106 a primary Internet Protocol (IP) address corresponding to the IMS PDN connection and a secondary IP address corresponding to the internet PDN connection.

At operation 503, the method 500 may include receiving by the IMS 105 the secondary IP address over the internet PDN connection. The IMS PDN connection may be disconnected by the communication network 102 post receiving the secondary IP address. In an embodiment, the UE 101 may share the secondary IP address for UE 101 reachability, as the IMS PDN connection may have been disconnected. In an embodiment, sharing the secondary IP address may include establishing a pseudo communication session in place of the disconnected IMS PDN connection, for the communication network 102 connecting with the UE 101 in the event that the UE 101 may receive an MT call.

In an embodiment, the communication network 102 may monitor a timer for the IMS PDN connection inactivity and delete the IMS PDN connection when a value of the timer exceeds a defined threshold (for example, without limitation to, three (3) minutes). The communication network 102 may generate an IMS PDN connection session release cause message including a value indicating an optimization of the IMS PDN connection.

At operation 504, the method 500 may include sending by the IMS 105 a MT call notification to the UE 101 using the secondary IP address, over the internet PDN connection after detecting a MT call directed to the UE 101. The IMS PDN connection may be re-established by the UE 101, based on the MT call notification.

In an embodiment, the communication network 102 may send an SIP invite to the UE 101 over the internet PDN connection.

In an embodiment, the IMS 105 may receive an SIP registration request, from the UE 101. The IMS 105 may subsequently send an SIP registration confirmation message to the UE 101 over the IMS PDN connection. The IMS 105 may connect for the MT call.

Figure 6:
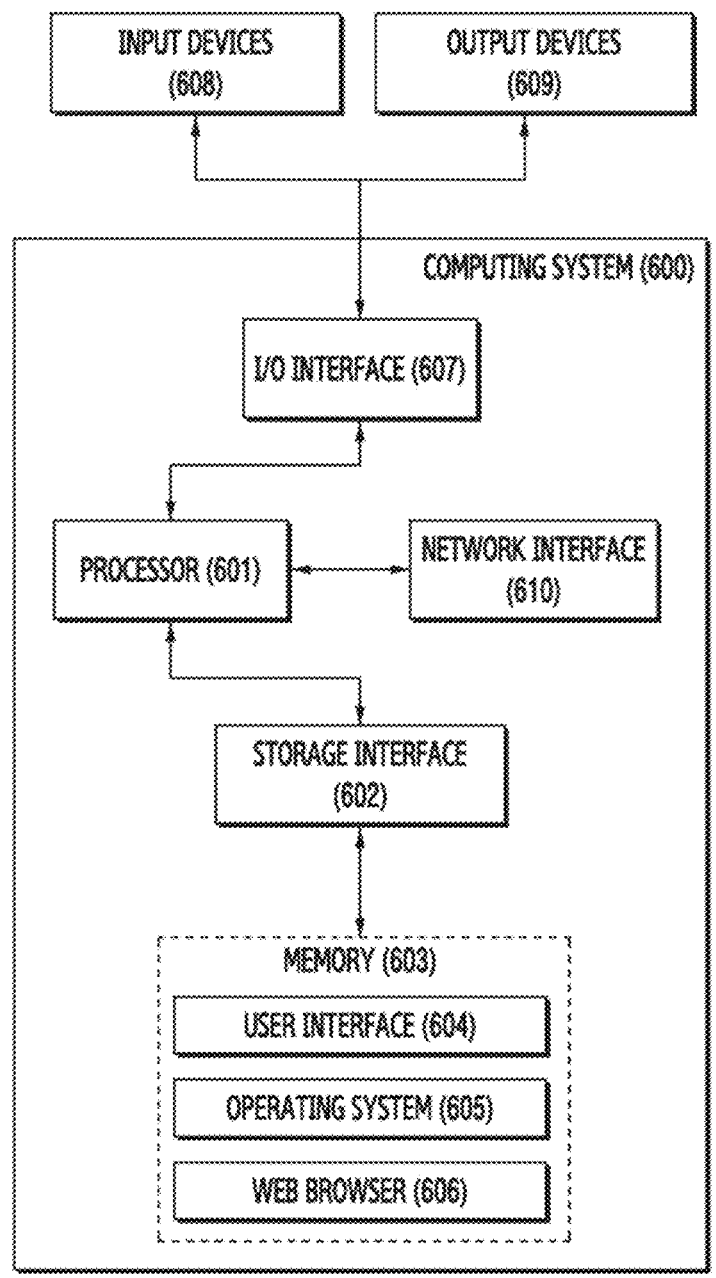
FIG. 6 illustrates a block diagram of an exemplary computer system, for executing embodiments consistent with the disclosure, in accordance with some embodiments of the disclosure.

FIG. 6 illustrates a block diagram of an exemplary computer system 600 for implementing embodiments consistent with the disclosure. The computer system may be, without limitation to, the UE 101 or one or more elements of the communication network 102. The computer system 600 may include a processor 601. The processor 601 may include at least one data processor for executing processes. The processor 601 may include specialized processing units such as, integrated system (bus) controllers, memory management control units, floating point units, graphics processing units, digital signal processing units, etc. The processor 601 may be or correspond to at least one processor that includes or corresponds to circuitry like a central processing unit (CPU), a microprocessor unit (MPU), an application processor (AP), a coprocessor (CP), a system-on-chip (SoC), or an integrated circuit (IC)

The processor 601 may be in communication with (one or more) input devices 608 and (one or more) output devices 609 via I/O interface 607. The I/O interface 607 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 607, the computer system 600 may communicate with (one or more) input devices 608 and (one or more) output devices 609. For example, the (one or more) input devices 608 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The (one or more) output devices 609 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processor 601 may be disposed in communication with external elements such as external computer systems, servers, network elements. The network interface 610 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc.

In some embodiments, the processor 601 may be disposed in communication with a memory 603 (e.g., RAM, ROM, etc.) via a storage interface 602. The storage interface 602 may connect to memory 603 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 603 may store a collection of program or database components, including, without limitation, user interface 604, an operating system 605, a web browser 606 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 605 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement the web browser 606 stored program components. The web browser 606 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 606 may utilize facilities such as AJAX, DHTML, ADOBE® FLASH®, JAVASCRIPT®, JAVA®, Application Programming Interfaces (APIs), etc. In some embodiments, the computer system 600 may implement a mail server stored program component. The mail server may be an Internet mail server such as Microsoft Exchange, or the like. The mail server may utilize facilities such as Active Server Pages (ASP), ACTIVEX®, ANSI@ C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform operations or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMS, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the disclosure, and that the article of manufacture may include suitable information bearing medium known in the art.

The above described one or more embodiments, may have the advantageous effect that, dimensioning resources from absolute two PDN connection per user/UE may be brought down to Service Level Agreement (SLA) percentage requirement. Another advantageous effect of the as described embodiments of the disclosure is, better congestion control due to deletion of the IMS PDN connection while not in use. A further advantage of the embodiment of the disclosure is a decrease in overhead time for increasing network operator/service provider user base by allocating IMS IP pool to internet IP pool.

A description of an embodiment with several components in communication with each other does not imply that all such components are required. On the contrary a variety of optional components are described to illustrate the wide variety of possible embodiments of the disclosure.

When a single device or article is described herein, more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIGS. 1, 4, and 5 show certain events occurring in a certain order. In alternative embodiments, certain operations may be performed in a different order, modified, or removed. Moreover, operations may be added to the above-described logic and still conform to the described embodiments. Further, operations described herein may occur sequentially or certain operations may be processed in parallel. Yet further, operations may be performed by a single processing unit or by distributed processing units.

According to an embodiment, a method for optimizing an internet protocol (IP) multimedia subsystem (IMS) packet data network (PDN) connection, comprises establishing, by a user equipment (UE), an IMS PDN connection and an internet PDN connection with at least one data network element of a communication network. A primary IP address corresponding to the IMS PDN connection and a secondary IP address corresponding to the internet PDN connection are allocated to the UE by the at least one data network element. The method comprises transmitting, by the UE to an IMS, information on the secondary IP address over the internet PDN connection, before disconnecting the IMS PDN connection by the communication network. The method comprises receiving, by the UE from the IMS, a mobile terminated (MT) call notification using the secondary IP address over the internet PDN connection while the IMS PDN connection is disconnected. The method comprises based on the received MT call notification, establishing, by the UE, the IMS PDN connection.

According to an embodiment, the transmitting the information on the secondary IP address comprises transmitting, by the UE to the IMS, a session initiation protocol (SIP) pseudo registration message.

According to an embodiment, the receiving the MT call notification comprises receiving, by the UE from the IMS, an SIP invite over the internet PDN connection, wherein the IMS PDN connection is established with the UE.

According to an embodiment, the establishing the IMS PDN connection comprises transmitting, by the UE to the IMS, an SIP registration request over the IMS PDN connection, receiving, by the UE from the IMS, an SIP registration confirmation message over the IMS PDN connection, and connecting, by the UE to the IMS, for a MT call.

According to an embodiment, a method for optimizing an internet protocol (IP) multimedia subsystem (IMS) packet data network (PDN) connection, the method comprising receiving, by at least one data network element of a communication network from a user equipment, a request for establishing an IMS PDN connection and an internet PDN connection, allocating, by the at least one data network element to a user equipment (UE), a primary IP address corresponding to the IMS PDN connection and a secondary IP address corresponding to the internet PDN connection, receiving, by an IMS from the UE, information on the secondary IP address over the internet PDN connection, before disconnecting the IMS PDN connection by the communication network, while the IMS PDN connection is disconnected, transmitting, by the IMS to the UE, a mobile terminated (MT) call notification using the secondary IP address, over the internet PDN connection after detecting a MT call directed to the UE, wherein the IMS PDN connection is established by the UE, based on the MT call notification.

According to an embodiment, the receiving the secondary IP address may comprise receiving, by the IMS from the UE, a session initiation protocol (SIP) pseudo registration message, wherein the secondary IP address is bound by the IMS, with a uniform resource identifier (URI) of the UE.

According to an embodiment, the disconnecting the IMS PDN connection may comprise monitoring, by the communication network, a timer for an inactivity of the IMS PDN connection, and deleting, by the communication network, the IMS PDN connection when a value of the timer exceeds a defined threshold.

According to an embodiment, the disconnecting the IMS PDN connection may comprise generating, by the communication network, an IMS PDN connection session release cause message including a value indicating an optimization of the IMS PDN connection.

According to an embodiment, the transmitting the MT call notification may comprise: transmitting, by the communication network to the UE, an SIP invite over the internet PDN connection, wherein the IMS PDN connection is established with the UE.

According to an embodiment, the establishing the IMS PDN connection may comprise: receiving, by the IMS from the UE, an SIP registration request over the IMS PDN connection, transmitting, by the IMS to the UE, an SIP registration confirmation message over the IMS PDN connection, and connecting, by the IMS to the UE, for the MT call.

According to an embodiment, a user equipment (UE) for optimizing an internet protocol (IP) multimedia subsystem (IMS) packet data network (PDN) connection, may comprise at least one processor comprising processing circuitry, and memory including one or more storage mediums storing instructions. The instructions that, when executed by the at least one processor individually or collectively, cause the UE to establish an IMS PDN connection and an internet PDN connection with at least one data network element of a communication network, wherein a primary IP address corresponding to the IMS PDN connection and a secondary IP address corresponding to the internet PDN connection are allocated to the UE by the at least one data network element. The instructions that, when executed by the at least one processor individually or collectively, cause the UE to transmit to an IMS, information on the secondary IP address over the internet PDN connection before the IMS PDN connection is disconnected by the communication network. The instructions that, when executed by the at least one processor individually or collectively, cause the UE to receive from the IMS, a mobile terminated (MT) call notification using the secondary IP address over the internet PDN connection while the IMS PDN connection is disconnected. The instructions that, when executed by the at least one processor individually or collectively, cause the UE to establish the IMS PDN connection based on the MT call notification.

According to an embodiment, the instructions that, when executed by the at least one processor individually or collectively, cause the UE to transmit, to the IMS, a session initiation protocol (SIP) pseudo registration message.

According to an embodiment, the instructions that, when executed by the at least one processor individually or collectively, cause the UE to receive, from the IMS, an SIP invite over the internet PDN connection, wherein the IMS PDN connection is established with the UE.

According to an embodiment, the instructions that, when executed by the at least one processor individually or collectively, cause the UE to transmit, to the IMS, an SIP registration request over the IMS PDN connection, receive, from the IMS, an SIP registration confirmation message over the IMS PDN connection, and connect, to the IMS, for a MT call.

According to an embodiment, an internet protocol (IP) multimedia subsystem (IMS) for optimizing IMS packet data network (PDN) connection, may comprise at least one processor comprising processing circuitry, and memory including one or more storage mediums storing instructions. The instructions that, when executed by the at least one processor individually or collectively, cause the IMS to receive, from a user equipment (UE), information on a secondary IP address among a primary IP address corresponding to an IMS PDN connection with the UE and the secondary IP address corresponding to an internet PDN connection with the UE, over the internet PDN connection before the IMS PDN connection is disconnected by at least one data network element. The primary IP address and the secondary IP address are allocated by the by at least one data network element. The instructions that, when executed by the at least one processor individually or collectively, cause the IMS to transmit, to the UE, a mobile terminated (MT) call notification using the secondary IP address, over the internet PDN connection after detecting a MT call directed to the UE while the IMS PDN connection is disconnected. The instructions that, when executed by the at least one processor individually or collectively, cause the IMS to establish the IMS PDN connection based on the MT call notification.

According to an embodiment, the instructions that, when executed by the at least one processor individually or collectively, cause the IMS to receive, from the UE, a session initiation protocol (SIP) pseudo registration message, wherein the secondary IP address is bound by the IMS, with a uniform resource identifier (URI) of the UE.

According to an embodiment, the at least one data network element may comprise a user plane function (UPF) in a Fifth Generation (5G) system. An inactivity of the IMS PDN connection is monitored using a timer by the at least one data network element.

According to an embodiment, the at least one data network element may comprise a session management function (SMF) in a 5G system. The IMS PDN connection is deleted by the SMF when a value of the timer exceeds a defined threshold.

According to an embodiment, the at least one data network element may comprise a serving PDN Gateway (SPGW) in a Fourth Generation (4G) system. The IMS PDN connection is deleted by the SPGW when a value of the timer exceeds a defined threshold.

According to an embodiment, an IMS PDN connection session release cause message including a value indicating an optimization of the IMS PDN connection is transmitted by the SPGW, upon a deletion of the IMS PDN connection.

According to an embodiment, a method for optimizing an internet protocol (IP) multimedia subsystem (IMS) packet data network (PDN) connection, may comprise establishing, by a user equipment (UE), an IMS PDN connection and an internet PDN connection with at least one data network element of a communication network. A primary IP address corresponding to the IMS PDN connection and a secondary IP address corresponding to the internet PDN connection are allocated to the UE by the at least one data network element. The method may comprise sharing, by the UE with an IMS, the secondary IP address over the internet PDN connection, before disconnecting the IMS PDN connection by the communication network. The method may comprise receiving, by the UE from the IMS, a mobile terminated (MT) call notification using the secondary IP address over the internet PDN connection. The method may comprise based on the received MT call notification, re-establishing, by the UE, the IMS PDN connection.

According to an embodiment, the sharing the secondary IP address may comprise sending, by the UE to the IMS, a session initiation protocol (SIP) pseudo registration message.

According to an embodiment, the receiving the MT call notification may comprise receiving, by the UE from the IMS, an SIP invite over the internet PDN connection, wherein the IMS PDN connection is re-established with the UE.

According to an embodiment, the re-establishing the IMS PDN connection may comprise: sending, by the UE to the IMS, an SIP registration request over the IMS PDN connection, receiving, by the UE from the IMS, an SIP registration confirmation message over the IMS PDN connection, and connecting, by the UE to the IMS, for a MT call.

According to an embodiment, a method for optimizing an internet protocol (IP) multimedia subsystem (IMS) packet data network (PDN) connection, may comprises receiving, by at least one data network element of a communication network from a user equipment, a request for establishing an IMS PDN connection and an internet PDN connection, allocating, by the at least one data network element to a user equipment (UE), a primary IP address corresponding to the IMS PDN connection and a secondary IP address corresponding to the internet PDN connection, receiving, by an IMS from the UE, the secondary IP address over the internet PDN connection, before disconnecting the IMS PDN connection by the communication network, and sending, by the IMS to the UE, a mobile terminated (MT) call notification using the secondary IP address, over the internet PDN connection after detecting a MT call directed to the UE, wherein the IMS PDN connection is re-established by the UE, based on the MT call notification.

According to an embodiment, the receiving the secondary IP address may comprise receiving, by the IMS from the UE, a session initiation protocol (SIP) pseudo registration message, wherein the secondary IP address is bound by the IMS, with a uniform resource identifier (URI) of the UE.

According to an embodiment, the disconnecting the IMS PDN connection may comprise monitoring, by the communication network, a timer for an inactivity of the IMS PDN connection, and deleting, by the communication network, the IMS PDN connection when a value of the timer exceeds a defined threshold.

According to an embodiment, the disconnecting the IMS PDN connection may comprise generating, by the communication network, an IMS PDN connection session release cause message including a value indicating an optimization of the IMS PDN connection.

According to an embodiment, the sending the MT call notification may comprise sending, by the communication network to the UE, an SIP invite over the internet PDN connection, wherein the IMS PDN connection is re-established with the UE.

According to an embodiment, the re-establishing the IMS PDN connection may comprise receiving, by the IMS from the UE, an SIP registration request over the IMS PDN connection, sending, by the IMS to the UE, an SIP registration confirmation message over the IMS PDN connection, and connecting, by the IMS to the UE, for the MT call.

According to an embodiment, a user equipment (UE) for optimizing an internet protocol (IP) multimedia subsystem (IMS) packet data network (PDN) connection, may comprise at least one processor, and at least one memory. The at least one processor may be configured to establish an IMS PDN connection and an internet PDN connection with at least one data network element of a communication network. A primary IP address corresponding to the IMS PDN connection and a secondary IP address corresponding to the internet PDN connection are allocated to the UE by the at least one data network element The at least one processor may be configured to share with an IMS, the secondary IP address over the internet PDN connection, wherein the IMS PDN connection is disconnected by the communication network. The at least one processor may be configured to receive from the IMS, a mobile terminated (MT) call notification using the secondary IP address over the internet PDN connection. The at least one processor may be configured to re-establish the IMS PDN connection based on the MT call notification.

According to an embodiment, the at least one processor may be configured to send, to the IMS, a session initiation protocol (SIP) pseudo registration message.

According to an embodiment, the at least one processor may be configured to receive, from the IMS, an SIP invite over the internet PDN connection, wherein the IMS PDN connection is re-established with the UE.

According to an embodiment, the at least one processor may be configured to send, to the IMS, an SIP registration request over the IMS PDN connection, receive, from the IMS, an SIP registration confirmation message over the IMS PDN connection, and connect, to the IMS, for a MT call.

According to an embodiment, a communication network for optimizing an internet protocol (IP) multimedia subsystem (IMS) packet data network (PDN) connection, may comprise at least one processor, at least one data network element, and an IMS. The at least one processor may be configured to receive, by the at least one data network element from a user equipment (UE), a request for establishing an IMS PDN connection and an internet PDN connection. The at least one processor may be configured to allocate, by the at least one data network element to the UE, a primary IP address corresponding to the IMS PDN connection and a secondary IP address corresponding to the internet PDN connection. The at least one processor may be configured to receive, by an IMS from the UE, the secondary IP address over the internet PDN connection, wherein the IMS PDN connection is disconnected by the at least one data network element. The at least one processor may be configured to send, by the IMS to the UE, a mobile terminated (MT) call notification using the secondary IP address, over the internet PDN connection after detecting a MT call directed to the UE. The at least one processor may be configured to re-establish, by the IMS, the IMS PDN connection based on the MT call notification.

According to an embodiment, the IMS may be configured to receive, from the UE, a session initiation protocol (SIP) pseudo registration message. The secondary IP address is bound by the IMS, with a uniform resource identifier (URI) of the UE.

According to an embodiment, the at least one data network element comprises a user plane function (UPF) in a Fifth Generation (5G) system. The at least one data network element may be configured to monitor a timer value for an inactivity of the IMS PDN connection.

According to an embodiment, the at least one data network element comprises a session management function (SMF) in a 5G system. The at least one data network element may be configured to receive a timer value related to data inactivity of the IMS PDN connection, delete the IMS PDN connection when the timer value exceeds a defined threshold, and send to a policy control function, an IMS PDN connection session release cause message including a value indicating an optimization of the IMS PDN connection.

According to an embodiment, the at least one data network element comprises a serving PDN Gateway (SPGW) in a Fourth Generation (4G) system. The at least one data network element may be configured to monitor a timer value for an inactivity of the IMS PDN connection, and delete the IMS PDN connection when the timer value exceeds a defined threshold.

According to an embodiment, the SPGW may be configured to send to a policy and charging rules function (PCRF) an IMS PDN connection session release cause message including a value indicating an optimization of the IMS PDN connection, upon a deletion of the IMS PDN connection.

According to an embodiment, the IMS may be configured to send, to the UE, a session initiation protocol (SIP) invite over the internet PDN connection, wherein the IMS PDN connection is re-established with the UE.

According to an embodiment, the IMS may be configured to receive, from the UE, an SIP registration request over the IMS PDN connection, send, to the UE, an SIP registration confirmation message over the IMS PDN connection, and connect, to the UE, for the MT call.

According to an embodiment, a system for optimizing an internet protocol (IP) multimedia subsystem (IMS) packet data network (PDN) connection, may comprises a UE, and a communication network comprising at least one data network element and an IMS.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

For one or more embodiments, at least one of the components set forth in one or more of the preceding figures may be configured to perform one or more operations, techniques, processes, and/or methods as set forth herein. For example, a processor (e.g., baseband processor) as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium (e.g., non-transitory storage medium) are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network, such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a proposed specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

Meanwhile, specific embodiments have been described in the detailed description of the disclosure, but it goes without saying that various modifications are possible without departing from the scope of the disclosure.

No claim element is to be construed under the provisions of 35 U.S.C. § 112, sixth paragraph, unless the element is expressly recited using the phrase "means for" or "means."

What is claimed is:

1. A method for optimizing an internet protocol (IP) multimedia subsystem (IMS) packet data network (PDN) connection, the method comprising:
   establishing, by a user equipment (UE), an IMS PDN connection and an internet PDN connection with at least one data network element of a communication network, wherein a primary IP address corresponding to the IMS PDN connection and a secondary IP address corresponding to the internet PDN connection are allocated to the UE by the at least one data network element;

transmitting, by the UE to an IMS, information on the secondary IP address over the internet PDN connection, before disconnecting the IMS PDN connection by the communication network;

receiving, by the UE from the IMS, a mobile terminated (MT) call notification using the secondary IP address over the internet PDN connection while the IMS PDN connection is disconnected; and based on the received MT call notification, establishing, by the UE, the IMS PDN connection.

2. The method of claim 1, wherein the transmitting the information on the secondary IP address comprises transmitting, by the UE to the IMS, a session initiation protocol (SIP) pseudo registration message.

3. The method of claim 1, wherein the receiving the MT call notification comprises receiving, by the UE from the IMS, an SIP invite over the internet PDN connection, wherein the IMS PDN connection is established with the UE.

4. The method of claim 1, wherein the establishing the IMS PDN connection further comprises:
transmitting, by the UE to the IMS, an SIP registration request over the IMS PDN connection;
receiving, by the UE from the IMS, an SIP registration confirmation message over the IMS PDN connection; and
connecting, by the UE to the IMS, for a MT call.

5. A method for optimizing an internet protocol (IP) multimedia subsystem (IMS) packet data network (PDN) connection, the method comprising:
receiving, by at least one data network element of a communication network from a user equipment, a request for establishing an IMS PDN connection and an internet PDN connection;
allocating, by the at least one data network element to a user equipment (UE), a primary IP address corresponding to the IMS PDN connection and a secondary IP address corresponding to the internet PDN connection;
receiving, by an IMS from the UE, information on the secondary IP address over the internet PDN connection, before disconnecting the IMS PDN connection by the communication network; and
while the IMS PDN connection is disconnected, transmitting, by the IMS to the UE, a mobile terminated (MT) call notification using the secondary IP address, over the internet PDN connection after detecting a MT call directed to the UE, wherein the IMS PDN connection is established by the UE, based on the MT call notification.

6. The method of claim 5, wherein the receiving the secondary IP address comprises:
receiving, by the IMS from the UE, a session initiation protocol (SIP) pseudo registration message, wherein the secondary IP address is bound by the IMS, with a uniform resource identifier (URI) of the UE.

7. The method of claim 5, wherein the disconnecting the IMS PDN connection comprises:
monitoring, by the communication network, a timer for an inactivity of the IMS PDN connection; and
deleting, by the communication network, the IMS PDN connection when a value of the timer exceeds a defined threshold.

8. The method of claim 5, wherein the disconnecting the IMS PDN connection comprises:

generating, by the communication network, an IMS PDN connection session release cause message including a value indicating an optimization of the IMS PDN connection.

9. The method of claim 5, wherein the transmitting the MT call notification further comprises:
transmitting, by the communication network to the UE, an SIP invite over the internet PDN connection, wherein the IMS PDN connection is established with the UE.

10. The method of claim 5, wherein the establishing the IMS PDN connection further comprises:
receiving, by the IMS from the UE, an SIP registration request over the IMS PDN connection;
transmitting, by the IMS to the UE, an SIP registration confirmation message over the IMS PDN connection; and
connecting, by the IMS to the UE, for the MT call.

11. A user equipment (UE) for optimizing an internet protocol (IP) multimedia subsystem (IMS) packet data network (PDN) connection, the UE comprising:
at least one processor comprising processing circuitry; and
memory including one or more storage mediums storing instructions,
wherein the instructions that, when executed by the at least one processor individually or collectively, cause the UE to:
establish an IMS PDN connection and an internet PDN connection with at least one data network element of a communication network, wherein a primary IP address corresponding to the IMS PDN connection and a secondary IP address corresponding to the internet PDN connection are allocated to the UE by the at least one data network element;
transmit to an IMS, information on the secondary IP address over the internet PDN connection before the IMS PDN connection is disconnected by the communication network;
receive from the IMS, a mobile terminated (MT) call notification using the secondary IP address over the internet PDN connection while the IMS PDN connection is disconnected; and
establish the IMS PDN connection based on the MT call notification.

12. The UE of claim 11, wherein the instructions that, when executed by the at least one processor individually or collectively, further cause the UE to transmit, to the IMS, a session initiation protocol (SIP) pseudo registration message.

13. The UE of claim 11, wherein the instructions that, when executed by the at least one processor individually or collectively, further cause the UE to receive, from the IMS, an SIP invite over the internet PDN connection, wherein the IMS PDN connection is established with the UE.

14. The UE of claim 11, wherein the instructions that, when executed by the at least one processor individually or collectively, further cause the UE to:
transmit, to the IMS, an SIP registration request over the IMS PDN connection;
receive, from the IMS, an SIP registration confirmation message over the IMS PDN connection; and
connect, to the IMS, for a MT call.

15. An internet protocol (IP) multimedia subsystem (IMS) for optimizing IMS packet data network (PDN) connection, wherein the IMS comprising:
at least one processor comprising processing circuitry; and memory including one or more storage mediums storing instructions, wherein the instructions that, when executed by the at least one processor individually or collectively, cause the IMS to:

receive, from a user equipment (UE), information on a secondary IP address among a primary IP address corresponding to an IMS PDN connection with the UE and the secondary IP address corresponding to an internet PDN connection with the UE, over the internet PDN connection before the IMS PDN connection is disconnected by at least one data network element, wherein the primary IP address and the secondary IP address are allocated by the by at least one data network element;

transmit, to the UE, a mobile terminated (MT) call notification using the secondary IP address, over the internet PDN connection after detecting a MT call directed to the UE while the IMS PDN connection is disconnected; and establish the IMS PDN connection based on the MT call notification.

16. The IMS of claim 15, wherein the instructions that, when executed by the at least one processor individually or collectively, further cause the IMS to receive, from the UE, a session initiation protocol (SIP) pseudo registration message, wherein the secondary IP address is bound by the IMS, with a uniform resource identifier (URI) of the UE.

17. The IMS of claim 15, wherein the at least one data network element comprises a user plane function (UPF) in a Fifth Generation (5G) system, and wherein an inactivity of the IMS PDN connection is monitored using a timer by the at least one data network element.

18. The IMS of claim 15, wherein the at least one data network element comprises a session management function (SMF) in a 5G system, and wherein the IMS PDN connection is deleted by the SMF when a value of the timer exceeds a defined threshold.

19. The IMS of claim 15, wherein the at least one data network element comprises a serving PDN Gateway (SPGW) in a Fourth Generation (4G) system, and wherein the IMS PDN connection is deleted by the SPGW when a value of the timer exceeds a defined threshold.

20. The IMS of claim 19, an IMS PDN connection session release cause message including a value indicating an optimization of the IMS PDN connection is transmitted by the SPGW, upon a deletion of the IMS PDN connection.

* * * * *